United States Patent [19]

Graefe et al.

[11] Patent Number: 4,844,955
[45] Date of Patent: Jul. 4, 1989

[54] MULTILAYER POLYMERIC COMPOSITE AND METHOD FOR ITS MANUFACTURE

[75] Inventors: Peter U. Graefe, Wayside; Karl T. Kuszaj, East Brunswick, both of N.J.

[73] Assignee: American Standard, Inc., New York, N.Y.

[21] Appl. No.: 134,816

[22] Filed: Dec. 18, 1987

[51] Int. Cl.⁴ .............................................. B32B 7/04
[52] U.S. Cl. .................................. 428/420; 428/423.1; 428/482; 428/424.2; 428/506; 428/483; 428/319.3; 156/310; 427/400
[58] Field of Search ................... 428/420, 423.1, 482, 428/483, 424.2, 506, 319.3; 427/400; 156/310

[56] References Cited

U.S. PATENT DOCUMENTS

| | | | |
|---|---|---|---|
| 3,959,521 | 5/1976 | Suetsugi et al. | 428/425 |
| 4,053,545 | 11/1977 | Fay | 428/321 |
| 4,333,987 | 8/1982 | Kwart et al. | 428/420 |
| 4,337,296 | 6/1982 | Varadhachary | 428/420 |
| 4,361,626 | 11/1982 | Boba et al. | 428/420 |

FOREIGN PATENT DOCUMENTS 2148786 6/1985 United Kingdom .

Primary Examiner—Ellis P. Robinson
Assistant Examiner—James J. Seidleck
Attorney, Agent, or Firm—Hoffmann & Baron

[57] ABSTRACT

A multilayer polymeric composite structure of high impact strength and delamination resistance possesses a polymeric cosmetic layer chemically bonded to a cross-linked, isocyanate-modified thermosetting polyester or polyether substrate layer. In one embodiment of the structure, a relatively thin, predominantly acrylic resin layer is chemically bonded through urethane linkages to a relatively thick, reinforced, polyester foam substrate layer. A reinforced reaction injection molding (RPIM) procedure for manufacturing the polymeric composite is also disclosed.

16 Claims, 2 Drawing Sheets

MULTILAYER POLYMERIC COMPOSITE AND METHOD FOR ITS MANUFACTURE

BACKGROUND OF THE INVENTION

This invention relates to a multilayer polymeric composite in which a polymeric surface layer is chemically bonded to a cross-linked, isocyanate-modified thermosetting unsaturated polyester or polyether resin layer to provide a high impact strength, delamination-resistant structure.

U.S. Pat. No. 4,664,982 describes a composite structure, e.g., a reinforced enameled steel product, having high impact strength and thermal shock resistance. The composite structure is formed having bonded thereto a finish layer on one side thereof and on the other side a layer of reinforced plastic to provide a laminate. While the composite structure possesses generally excellent physical and mechanical properties as a result of the chemical bonding, or union, of the reinforced plastic layer to the enameled steel layer, due to the presence of steel, the structure is fairly heavy for a given level of strength and stiffness. Other disclosures of the chemical bonding of an organic polymeric material to an inorganic material such as metal, glass or ceramic can be found in U.S. Pat. Nos. 3,477,869; 3,661,628; 3,671,562; 3,705,911; 3,706,592; 3,754,971; 3,956,353; 4,147,712; and, 4,156,677, among others.

Numerous unsaturated polyesters and polyethers including those modified by reaction with isocyanates, and cross-linked dense foams prepared therefrom are known in the art.

Borgnaes et al. (Ashland Chemical Company), "RIMing of Low Viscosity Crosslinkable Alcohols with Diisocyanates", a paper presented at a meeting of the Polyurethane Manufacturer's Association in Miami, Fla. on Oct. 18, 1983, describes the chemistry of a commercially available unsaturated monoalcohol ester monomer, Ashland Chemical Company's V110-2, and the aromatic diisocyanate adduct of the ester. This monomer and its aromatic diisocyanate adduct are among the useful polyester materials which can be used in whole or in part to provide the polymeric composite of the present invention. A generic disclosure of the unsaturated monoalcohol ester monomer may be found in U.S. Pat. No. 3,663,599. Ashland Chemical Company's polyester and its use in the reaction injection molding (RIM) of fiber-reinforced composite structures are discussed in its product information brochures ASHLAND V110-2, ARIMAX 1000 SERIES RESINS and ARIMAX 1000 SYSTEM. Amoco Chemicals Corporation's Technical Service Report Nos. GTSR 18 ("Updated Hybrid Resin Technology"), GTSR 26 ("Aromatic Mixed Esters For Urethane Applications"), GTSR 27 ("Polyester Polyols for Reaction Injection Molding") and GTSR 32 ("Aromatic Polyester Thermoplastic Urethanes Program Summary") describe another type of isocyanate-modified polyester which can be used in the manufacture of the polymeric composite structure herein.

U.S. Pat. No. 3,367,992 describes thermosetting foams based on ester monomers which, like Ashland Chemical Company's V110-2 ester monomer, contain both terminal hydroxyl functionality (as part of a carboxylic acid group) and terminal ethylenic unsaturation. Adducts of the ester monomers with a polyfunctional material such as a polyisocyanate are also described. Other disclosures of thermosetting unsaturated polyesters and/or their polyisocyanate adducts can be found in U.S. Pat. Nos. 3,772,241; 3,823,099; 3,883,612; 4,119,510; 4,216,294; Reissue No. 31,468 (of 4,256,910); 4,280,979; 4,314,036; 4,358,548; and, 4,464,320. For still other useful polyester materials, reference may be made to "Polyesters, Unsaturated" in the *Encyclopedia of Polymer Science and Technology*, Vol. 11, pp. 129 et seq., Bjorkstein et al., *Polyesters and Their Applications*, 4th ed., Reinhold Publishing Company, New York (1960) and Boeing, *Unsaturated Polyesters: Structures and Properties*, Elsevier Publishing Company, Amsterdam (1964). U.S. Pat. Nos. 3,654,224 and 3,917,666, among others, describe unsaturated polyethers which are useful in the practice of the present invention.

Multilayer polymeric composites in which a polymeric layer or coating is associated with a thermosetting polymer substrate are known. U.S. Pat. No. 3,257,266 describes a fiber-reinforced unsaturated polyester foam structure possessing a weatherable polyvinyl fluoride facing. U.S. Pat. No. 4,053,545 describes a laminated structural foam possessing an injection molded thermoplastic fiber-reinforced dense foam backing, e.g., one of polyethylene or polystyrene, adhesively bonded to a thermoformed finish layer, e.g., one of acrylic such as Swedcast cast acrylic sheet type 300. The laminated foam is said to be useful in the manufacture of wash basins, shower stalls, bathtubs, etc. U.S. Pat. No. 4,130,614 describes a structural laminate possessing a fiber-reinforced polyesterurethane foam backing layer and a facing sheet such as paper, acrylic film and polyvinylfluoride film. U.S. Pat. No. 4,315,964 describes a laminate possessing a cured layer of glass fiber-reinforced unsaturated polyester and a surface layer of polyvinyl fluoride film. RIM is one of several processing techniques which can be used to manufacture the laminate. U.S. Pat. No. 4,551,390 describes the molding of multi-ply polymeric composites employing thick molding compounds (TMC), bulk molding compounds (BMC) or sheet molding compounds (SMC) and unsaturated ester monomers such as those disclosed in U.S. Pat. Nos. 3,772,241 and 3,883,612, supra.

While none of the foregoing prior patents discloses or suggests the chemical bonding of a polymeric layer or coating to a thermosetting polymer substrate, the chemical bonding of dissimilar organic polymers is known. According to U.S. Pat. No. 3,501,564, a non-cured polyurethane elastomer layer and a different non-cured polymer surface layer are simultaneously cured to provide permanent unification or cross-linking or chemical and mechanical integration thereof. The non-cured surface polymer can be an epoxy resin which has been applied to a mold surface and cured only to the point of being self-sustaining. The heat produced by the curing polyurethane layer will effect the curing of the epoxy surface layer and also result in the bonding of the two layers as previously described. U.S. Pat. Nos. 3,507,114; 3,716,604; 3,813,308; 4,053,680; and, 4,232,608 describe the chemical cross-linking of the polymer matrix component of a solid rocket propellant with the polymeric component of the rocker motor casing, or liner. U.S. Pat. No. 3,507,114 employs a diisocyanate to react with the hydroxyl groups of a hydroxyl-terminated polybutadiene, the polymer which is common to both the propellant matrix and the liner. Similar approaches to chemical bonding are disclosed in aforementioned U.S. Pat. Nos. 3,716,604, 3,813,308 and 4,232,608 as well as in U.S. Pat. No. 4,337,111. U.S. Pat. No. 3,725,174 describes the chemical bonding of at least two layers of normally incompatible polymers, e.g., a highly hydrogen-bonded polymer such as cellulose and a thermoplastic polymer such as polyethylene, employing an ethylenically unsaturated carboxylic acid or anhydride such as maleic anhydride and a free radical initiator. U.S. Pat. No. 3,764,370 achieves chemical cross-linking of a resin substrate to a resin coating by generating "living" radicals at the surface of the resin substrate employing ultraviolet light radiation, the "living radicals" then reacting with suitable groups possessed by the resin coating. U.S. Pat. No. 3,959,521 describes chemically uniting a resinous topcoat to a polymeric base by applying to the latter an undercoat based on a composition containing both ethylenically unsaturated groups and free isocyanate groups, applying the topcoat which also contains ethylenically unsaturated groups and curing both the undercoat and the topcoat. U.S. Pat. No. 4,282,285 describes a RIM process for making automobile bumper fascia in which a liquid microcellular polyurethane reacting mixture is polymerized against a decorative or protective transfer coating containing a polyurethane catalyst. The catalyst acts to bond the transfer coating to the polyurethane so that the shaped part upon removal from the mold contains a firmly adherent coating of the transfer coating composition. The transfer coating can be either a thermoplastic or a thermosetting polymer, with or without a plasticizer. Examples of useful transfer coatings include acrylic and acrylic ester polymers, pre-reacted urethane polymers, saturated and unsaturated polyesters, epoxy esters, cellulose esters, polyolefins, and vinyl an vinylmelamine polymers. U.S. Pat. Nos. 4,333,987, 4,337,296 and 4,361,626 describe related procedures for chemically bonding dissimilar polymeric materials, e.g., a vinyl resin material and a polyurethane, to provide multi-layer sheet materials such as resilient floor, wall or ceiling coverings, or resilient desk, table or counter tops.

None of the foregoing prior patents relating to the chemical bonding of dissimilar polymeric materials even remotely suggests the application of chemical bonding to the manufacture of a composite, or laminate, possessing a polymeric cosmetic layer and a cross-linked, isocyanate-modified, thermosetting polyester or polyether resin substrate layer as in the present invention.

It is an object of the present invention to provide a multilayer polymeric composite which is significantly lighter than a metal-containing, e.g., steel-containing, polymeric composite for an approximately equivalent level of strength and stiffness.

It is another object of the present invention to provide a multilayer polymer composite which is exceptionally resistant to delamination due to the chemical bonding of dissimilar polymer layers.

It is yet another object of the present invention to provide a multilayer polymeric composite which readily lends itself to manufacture by RIM or RRIM technology.

SUMMARY OF THE INVENTION

By way of realizing these and other objects of the invention, a polymeric composite of high impact strength and delamination resistance is provided which comprises (a) a polymeric cosmetic layer which, prior to the curing of a substrate layer in mutual contact therewith, possesses a chemically reactive first functionality on at least the surface thereof to be bonded to the substrate layer; and, (b) a cross-linked, isocyanate-modified thermosetting unsaturated polyester and/or polyether resin substrate layer which, prior to curing, possesses a chemically reactive second functionality such that upon curing while in mutual contact with a surface of the cosmetic layer, the substrate layer becomes bonded to the cosmetic layer through chemical linkages formed by reaction of first and second functionalities.

The foregoing polymeric composite is formed by the method which comprises:

(a) providing a polymeric cosmetic layer which possesses a chemically reactive first functionality on at least the surface thereof to be bonded to a substrate layer;

(b) contacting the surface of the cosmetic layer which possesses the first functioality with the precursor components of a cross-linked, isocyanate-modified thermosetting unsaturated polyester and/or polyether resin substrate layer, at least one component of which contains a chemically reactive second functionality capable, under conditions resulting in the cure of the substrate layer, of forming chemical linkages between the cosmetic layer and the substrate layer by reaction with the first functionality; and, (c) subjecting the combined cosmetic layer and substrate layer to conditions effecting the cure of the latter and the reaction of the first and second functionalities, thereby providing the polymeric composite.

The high strength of the chemical linkages resulting from the foregoing method results in a composite structure which is significantly higher in impact strength and more resistant to delamination than bonds obtained with known and conventional contact adhesives. Apart from its excellent delamination resistance, the multilayer polymer composite herein combines exceptionally light weight with a high level of mechanical strength and stiffness as well as high corrosion resistance. As such, the polymeric composite of this invention is well suited for the replacement of more traditional materials, particularly metals such as steel and aluminum but other polymeric materials as well, for a great variety of structures including construction panels, doors, interior and exterior automotive body elements, load bearing components, and the like. In addition to its desirable chemical and mechanical properties, the polymer composite of this invention has the advantage of being readily manufactured by known and conventional RIM and RRIM techniques. Employing such techniques, all sorts of molded devices, parts, elements, etc., can be efficiently manufactured at low cost with the foregoing polymeric composite making the composite still more competitive with those materials of construction which it is intended to replace.

DESCRIPTION OF THE PREFERRED EMBODIMENTS

Figure 1:
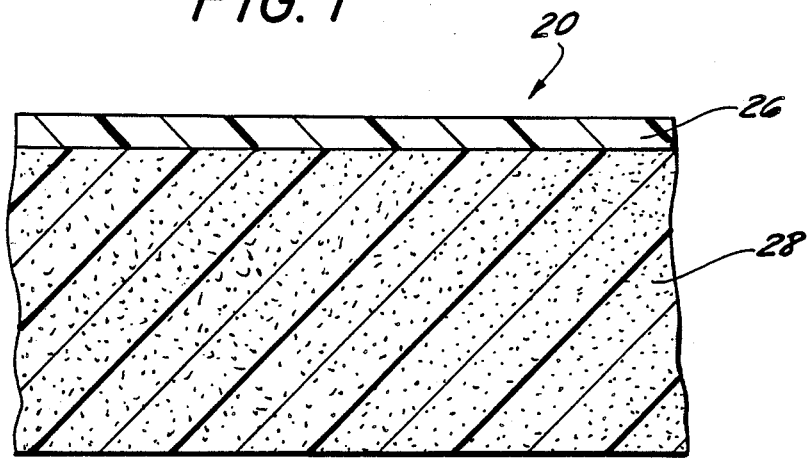
FIG. 1 is a greatly enlarged sectional view of the polymeric composite of this invention.

Cosmetic layer (a) can be fabricated from any one of several thermoplastic and thermosetting resins. Alloys and blends of resins are also contemplated. In general, the selected resin will be chosen with the end use of the composite in mind, e.g., high surface gloss and hardness (for resistance to scratching) in the case of a decorative panel.

It is also within the scope of this invention to provide cosmetic layer (a) as two, three or even more individual layers of different thermoplastic and/or thermosetting resins. For example, an acrylonitrile-butadiene-styrene terpolymer can be arranged as the outermost layer of a two-ply laminate with a coextruded acrylonitrile-butadiene-styrene-vinyl alcohol copolymer (derived in a known manner from the hydrolysis of the corresponding acrylonitrile-butadiene-styrene-vinyl acetate copolymer) serving as the underlying layer. The resulting laminar structure possesses a chemically inert upper surface and a chemically reactive lower surface (due to the presence of hydroxyl functionality contributed by the interpolymerized vinyl alcohol monomer groups) providing sites for reaction with suitably reactive sites possessed by substrate layer (b), e.g., isocyanate groups, as will be more fully explained.

Thermoplastic materials (inclusive of all resins which can be processed, e.g., extruded, at normal thermoplastic processing temperatures) useful in providing cosmetic layer (a) include acrylonitrile-butadiene-styrene terpolymer and related resins such as acrylonitrile-chlorinated polyethylene-styrene terpolymer, acrylic-styrene-acrylonitrile terpolymer and olefin-modified styrene-acrylonitrile terpolymer; acetal homopolymer (polyoxymethylene) and copolymer; acrylic resins, in particular, polymethylmethacrylate; polyimide and bis-maleimide resins; ionomer resins; melamine resins; nylon homopolymers and copolymers such as polyamide-imide; polyesters such as polyethylene terephthalate and polybutylene terephthalate; phenyene-based resins such as modified polyphenylene ether and modified polyphenylene oxide; polyarylate; sulfone polymers such as polysulfone; polyarylsulfone and polyethersulfone; polyolefin homopolymers and copolymers such as polyethylene, polypropylene, polybutylene, polymethylpentene, ethylene-propylene copolymer, ethylene-propylene-butylene terpolymer, ethylene-methyl acrylate copolymer, ethylene-ethyl acrylate copolymers, ethylene-vinyl acetate copolymer; polyetheretherketone; styrene homopolymers and copolymers such as polystyrene, styrene-acrylonitrile copolymer and styrene-butadiene copolymer; polyurethane, polyvinyl and polyvinylidene halides such as polyvinyl chloride, polyvinylidene chloride and polyvinyl fluoride; thermoplastic elastomers, and the like.

Alloys and blends of the foregoing which can be used to provide cosmetic layer (a) include acrylonitrile-butadiene-styrene and polycarbonate, polytetrafluoroethylene, polyvinylchloride or polysulfone; acrylic-styrene-acrylonitrile terpolymer and polyvinylchloride or polymethylmethacrylate, acetal resin and an elastomer; polyvinyl chloride and acrylic; nylon and ionomers, ethylene copolymer, ethylene-propylene-diene monomer, polyethylene or polytetrafluoroethylene; polycarbonate together with polybutylene terephthalate and an elastomer; polycarbonate and polyethylene, polyethylene terephthalate or styrene-maleic anhydride copolymer; polybutylene terephthalate and polyethylene terephthalate or an elastomer; polyethylene terephthalate and polymethyl-methacrylate, an elastomer or polysulfone; polypropylene and ethylene-propylene-diene monomer or ethylene-propylene monomer; polyethylene and polybutylene; polyolefin and ionomer resin; polyphenylene ether and polystyrene or polyamide; polyphenylene sulfide and an elastomer; styrene-acrylonitrile and ethylene-propylene-diene monomer; styrene-maleic anhydride copolymer and polystyrene; and, polyvinyl chloride and ethylene vinyl acetate, chlorinated polyethylene, nitrile rubber or polyurethane.

Among the thermosetting polymers which can be used to provide cosmetic layer (a) are amino resins; epoxy resins; phenolics; thermosetting polyesters, alkyds and polyimides; and, polyurethanes.

Cosmetic layer (a) and/or substrate layer (b) can contain one or more additives in the customary amounts, e.g., reinforcements based on treated or non-treated, non-woven or woven, fibers of such organic and inorganic materials as polyester, polyamide, particularly an aramid such as DuPont's Kevlar, carbon, boron, glass and hybrids of the foregoing such as aramid and carbon or glass, carbon and glass, etc.; treated and non-treated fillers and extenders such as calcium carbonate, kaolin, talc, alumina trihydrate, wood-and shell flours, silica, diatomaceous earth, glass spheres, wollastonite, mica and metallic powders; colorants, flame retardants; foaming agents; heat stabilizers; impact modifiers; plasticizers; and, ultraviolet stabilizers.

Cosmetic layer (a) can represent from about 0.1 to as much as about 50 percent or more of the total thickness of the composite and for most applications, will vary from about 0.5 to about 30 percent of total thickness. At the lower end of these ranges, surface layer (a) can be thought of as a coating and, indeed, can be applied to a suitable temporary support, e.g., a male mold member, by coating, spraying and similar procedures. The thickness of cosmetic layer (a) need not be uniform. In fact, for some applications, it may be desired to selectively increase the thickness of cosmetic layer (a) in certain areas, e.g., where this layer would be most subject to abrasive erosion or other wear.

The exposed surface of cosmetic layer (a) can be modified or texturized in known and conventional ways so as to simulate the natural appearance of wood, brick, stone, metal or other material.

Substrate layer (b) is a cross-linked, isocyanate-modified, thermosetting unsaturated polyester resin, and/or unsaturated polyether resin or mixtures thereof. In general, any of the known and conventional initially liquid, ethylenically unsaturated polyesters and polyethers possessing one or more active hydrogen-containing groups, e.g., hydroxyl, carboxylic acid, amine, etc., can be used to provide substrate layer (b) herein.

The unsaturated polyesters are generally prepared by the polyesterification of polycarboxylic acid and/or polycarboxyiic acid anhydrides and polyols, usually glycols. At least one of the ingredients in the polyester contains ethylenic unsaturation, usually the polycarboxylic acid or corresponding anhydride. Typical unsaturated polyester resins are fabricated from dicarboxylic acids such as phthalic acid, phthalic anhydride, adipic acid, succinic acid, tetrahydrophthalic acid or anhydride, tetrabromophthalic acid or anhydride, maleic acid or anhydride or fumaric acid. Typical glycols include ethylene glycol, propylene glycol, butylene glycol, neopentyl glycol, diethylene glycol, dipropylene glycol, polyethylene glycol and polypropylene glycol. Occasionally trihydric and higher polyols are included in the polyester such as trimethylol ethane, trimethylol propane, pentaerythritol, etc. Customarily a slight stoichiometric excess of glycol is employed in preparing the unsaturated polyester.

Unsaturated polyester resin syrups are obtained when an unsaturated polyester resin is combined with copolymerizable monomers which contain terminal vinyl groups. These monomers are well known in the art and include hydrocarbon monomers such as styrene, alphamethylstyrene, methylstyrene, 2,4-dimethylstyrene, ethylstyrene, isopropylstyrene, butylstyrene, phenylstyrene, cyclohexylstyrene, benzylstyrene, and the like, substituted styrenes such as cyanostyrene, nitrostyrene, N,N-dimethylaminostyrene, acetoxystyrene, methyl 4-vinylbenzoate, phenoxystyrene, p-vinyl diphenyl sulfide, p-vinylphenyl phenyl dioxide, and the like; acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, acrylonitrile, methacrylonitrile, ethyl alpha-ethoxyacrylate, methyl alpha-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; vinyl and vinylidene halides, e.g., vinyl chloride, vinyl fluoride, vinylidene chloride, and the like; vinyl esters, vinyl ethers, vinyl ketones, etc., such as vinyl acetate, vinyl alcohol, vinyl butyrate, isopropenyl acetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like; butadiene, isoprene, 1,4-pentadiene, 1,6-hexadiene, 1,7-octadiene. Any of the known polymerizable monomers can be used and the compounds listed above are illustrative and not restrictive of the monomers suitable for us in this invention. Customarily the copolymerizable monomer is provided in an amount to constitute from about 10 to about 70 weight percent of the unsaturated polyester resin syrup, i.e., the unsaturated polyester resin comprises from about 9 to about 30 weight percent of the resin syrup.

A preferred type of unsaturated polyester is one possessing both terminal ethylenic saturation and at least one terminal active hydrogen-containing group such as a hydroxyl, carboxylic acid and/or an amine group. Polyesters of this type include ASHLAND V110-2 monomer (Ashland Chemical Company), and those described in U.S. Pat. No. 3,663,599, supra, the contents of which are incorporated by reference herein. The preferred unsaturated polyester is actually a mixture of polyesters of the general formula

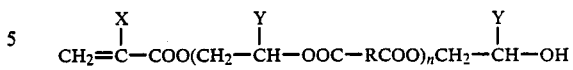

wherein X is hydrogen, methyl or ethyl, Y is hydrogen, methyl, phenyl or CH$_2$Z, in which Z is a halogen or an alkyl group, R represents an aliphatic or alicyclic group containing ethylenic unsaturation and n is an integer of from 0 to 4. The polyesters are prepared by reacting an ethylenically unsaturated carboxylic acid of the structure

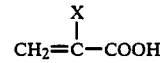

with a carboxylic acid anhydride of the structure

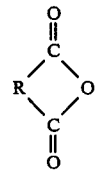

and a monoepoxide of the general formula

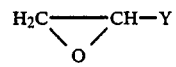

wherein the significance of X, Y and R is as stated above. Examples of suitable ethylenically unsaturated carboxylic acids include acrylic acid, methacrylic acid, ethylacrylic acid, and the like, methacrylic acid being especially preferred. Of the useful carboxylic acid anhydrides, maleic anhydride is especially preferred. Useful monopoxides include ethylene oxide, propylene oxide, butylene oxide, styrene oxide, epichlorohydrin, methylepichlorohydrin, and the like, propylene oxide being especially preferred. An especially preferred polyester, ASHLAND V110-2 monomer (Ashland Chemical Company), is prepared by reacting methacrylic acid with maleic anhydride and propylene oxide to provide a mixture of maleate esters of the structure

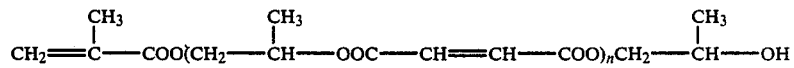

where n is 0 to 4. In a known manner, the maleate esters can, if desired, be isomerized to the corresponding fumarate esters, e.g., employing an amine. Reaction products obtained from the fumarate esters tend to be harder and more resistant to heat distortion than those obtained with the maleate ester. When employing the aforesaid preferred polyesters, it is advantageous to provide them in combination with one or more copolymerizable monomers, unsaturated polyesters and/or unsaturated polyester syrups such as those previously mentioned. For example, in a mixture of such preferred polyester(s) and any of the known polyester syrups referred to above, the former can represent from about 10 to about 90, and preferably from about 20 to about 80 weight percent, of the total.

Unsaturated polyethers which are useful in the preparation of the resin of substrate layer (b) can be prepared by the homopolymerization or copolymerization of alkylene oxides and unsaturated difunctional initiators such as the ethylenically unsaturated diols, dicarboxylic acids, carboxylic acid anhydrides, etc. Suitable unsaturated polyethers are described in the non-patent and patent literature, e.g., U.S. Pat. Nos. 3,654,224 and 3,917,666. The polyethers can also be combined with substantial quantities of copolymerizable monomer(s), functional group-terminated unsaturated polyester(s) and/or unsaturated polyester syrup(s) such as any of those previously described.

Cross-linking of the unsaturated polyester/polyether component(s) and copolymerization of the vinyl group-terminated monomer component of the substrate layer reaction mixture is accomplished with one or more free radical polymerization initiators, or catalysts, notably organic peroxides, including di-t-butyl peroxide, 2,5-dimethyl-2,5-dimethyl-2,5-bis(t-butylperoxy)hexane, 2,5-dimethyl-2-5-bis(t-butylperoxy)hexane-3, di-t-amyl peroxide, t-butyl-2-hydroxyethyl peroxide, a,a'-bis(t-butylperoxy)diisopropyl benzene, benzoyl peroxide, diisobutyryl peroxide, 2,4-dichlorobenzoyl peroxide, diisononanoyl peroxide, decanoyl peroxide, lauroyl peroxide, acetyl peroxide, succinic acid peroxide, bis-p-chlorobenzoyl peroxide, 2,5-dihydroperoxy-2,5-dimethylhexane, cumene hydroperoxide, t-butyl hydroperoxide, p-methane hydroperoxide, diisopropylbenzene hydroperoxide, 1,1,3,3-tetramethyl butyl hydroperoxide, dicumyl peroxide, di(n-propyl)peroxy dicarbonate, diisopropyl peroxydicarbonate, di(sec-butyl)peroxydicarbonate, di(2-ethylhexyl) peroxydicarbonate, dicyclohexyl peroxydicarbonate, dicetyl peroxydicarbonate, bis-(4-t-butylcyclohexyl)peroxydicarbonate, t-butylperoxy isopropyl monocarbonate, 2,2-azobis-(isobutyronitrile), 1,1-bis(t-butyl peroxy-3,3,5-trimethylcyclohexane, t-butyl peroxyacetate, t-butyl peroxyisobutyrate, t-butyl peroxy-2-ethylhexanoate, t-butyl peroxy pivalate, t-butyl peroxyneodecanoate, t-butyl peroxymaleic acid, di-t-butyl diperoxyphthalate, 2,5-dimethyl-2,5-bis(benzoylperoxy)hexane, 2,3-dimethyl-bis(octanoylperoxy)hexane, t-butyl peroctoate, t-butyl perbenzoate, acetylcyclohexyl sulfonyl peroxide, acetyl sec-heptyl sulfonyl peroxide, 2-t-butylazo-2-cyano-4-methoxy-4-methyl pentane, 2-t-butylazo-2-cyano-4-methyl pentane, 2-t-butylazo-2-cyanopropane, methyl ethyl ketone peroxide, 2,4-pentanedione peroxide, cyclohexanone peroxide, etc. The concentration of free radical polymerization initiator is not critical and can be varied within wide limits. Up to a certain point (which can be readily experimentally determined for a given reaction mixture), increases in the concentration of the initiator/catalyst tend to result in increased cross-linking and vinyl monomer copolymerization but increases in initiator/catalyst beyond this point are unlikely to significantly affect conversion. As a representative range, the concentration of initiator/catalyst can vary from about 0.1 to about 5 weight percent based on the total weight of unsaturated polyester, polyether and copolymerizable vinyl group-terminated monomer.

The foregoing unsaturated polyester/polyether component(s) are modified with one or more organic polyisocyanates such as ethylene diisocyanate, ethylidene diisocyanate, propylene diisocyanate, butylene diisocyanate, cyclopentylene-1,3 diisocyanate, cyclohexylene-1,4-diisocyanate, cyclohexylene-1,2-diisocyanate, 2,4-tolylene diisocyanate (TDI), 2,6-tolylene diisocyanate, diphenylmethane 4,4'-diisocyanate (MDI) 2,2-diphenylpropane-4,4'-diisocyanate, p-phenylene diisocyanate, xylylene diisocyanate, 12,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, 4,4'4'-triisocyanatotriphenylmethane, 1,3,5-triisocyanato benzene, 2,4,6-triisocyanato toluene, 4,4'-dimethyl diphenylmethane-2,2',5,5'tetraisocyanate, furfurylidene diisocyanate, and the like, as well as their mixtures.

The term "organic polyisocyanate" or, simply, "isocyanate" includes the isocyanate-terminated reaction products resulting from the reaction of the foregoing isocyanates with a polyol. Quasi-prepolymers such as the reaction products of excess tolylene diisocyanate and short chain polyoxypropylene diols or triols are preferred in those instances where ease of processing is desired. The term "organic polyisocyanate" also includes the known and conventional dimer and trimer (isocyanurate) analogs of the foregoing isocyanates. A preferred isocyanate of this type is TDI dimer which is commercially available or can be synthesized from commercially available TDI. In general, it is especially preferred to use the readily accessible polyisocyanates such as 2,4- and 2,6-tolylene diisocyanate and mixtures of these isomers ("TDI"), polyphenylpolymethylene polyisocyanates of the type obtained by condensing aniline with formaldehyde, followed by phosgenation, "crude" MDI and distilled or "pure" MDI, and polyisocyanates containing carbodiimide groups, urethane groups, allophanate groups, isocyanurate groups, urea groups or biuret groups ("modified polyisocyanates"). Each of these materials is well known in the patent literature. Further typical examples of modified liquid MDI types of isocyanates are described in U.S. Pat. No. 3,384,653 and various quasi-prepolymers are described in U.S. Pat. Nos. 3,394,164; 3,644,457; 3,457,200; 3,883,771; 4,469,616; and 4,559,366.

The amount of organic polyisocynate used is not critical and preferably ranges from an amount that provides from about 0.9 to about 1.2 isocyanate groups per active hydrogen-containing group of the unsaturated polyester/ polyether. These amounts are suitable when the compositions are cast in a mold. Where RIM or RRIM techniques are used or a low pressure molding or sheet molding technique is employed, the range preferably is from about 1 to about 1.1 isocyanate groups per active hydrogen-containing group. Catalysts which are useful in effecting the urethane-modifying reaction include (a) tertiary amines such as bis(dimethylaminoethyl) ether, trimethylamine, triethylamine, N-methylmorpholine, N-ethylmorpholine, N,N-dimethylbenzlamine, N,N-dimethylethanolamine, N,N,N',N'-tetramethyl-1,3-butanediamine, triethylanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2carboxylate, acetylacetoneimine, bis-acetylacetonealkylenediimines, salicyclaldehydeimine, and the like, with various metals such as Be, Mg, Zn, Cd, Pb, Ti, Zr, Sn, As, Bi, Cr, Mo, Mn, Fe, Co, Ni, or such ions as $MoO_2++$, $UO_2++$ and the like; (f) alcoholates and phenolates of various metals such as $Ti(OR)_4$, $Sn(OR)_4$, $Sn(OR)_2$, $Al(OR)_3$, and the like; wherein R is alkyl or aryl, and the reaction products of alcoholates with carboxylic acids, beta-diketones, and 2-(N,N-dialkylamino) alkanols, such as the well known chelates of titanium obtained by said or equivalent procedures; (g) salts of organic acids with a variety of metals such as alkali metals, alkaline earth metals, Al, Sn, Pb, Mn, Co, Ni and Cu, including, for example, sodium acetate, potassium laurate, calcium hexanoate, stannous acetate, stannous octoate, stannous oleate, lead octoate, metallic driers such as manganese and cobalt naphthenate, and the like; and, (h) organometallic derivatives of tetravalent tin, trivalent and pentavalent As, Sb, and Bi and metal carbonyls of iron and cobalt.

The organotin compounds deserve particular mention as catalysts for catalyzing the urethane-modifying reaction. These compounds include the dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, bitutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts, e.g., the organotin catalysts. Metal catalysts or combinations of metal catalysts can also be employed as the accelerating agents without the use of amines. The catalysts for catalyzing the urethane-modifying reaction are employed in small amounts, for example, from about 0.001 percent to about 5 percent, based on the combined weight of the polyisocyanate and the unsaturated polyester/polyether.

An extender can also be added to the reaction mixture providing substrate layer (b) in order to improve the load bearing and modulus properties of the cured material. Suitable extenders include low molecular weight polyols including ethylene glycol, diethylene glycol, 1,4-butanediol and the aromatic glycols reaction products of alkylene oxides with aromatic amines or alcohols having two active hydrogens. Suitable aromatic glycols are the reaction products of alkylene oxides with amino aryl compounds and di(hydroxyalkoxy)aryl compounds, and preferably are the reaction products of ethylene oxide and aniline. Other suitable aromatic glycols include the ethylene oxide and propylene oxide adducts of bisphenol A and the propylene oxide adducts of aniline. Additional suitable extenders are the aromatic amines such as 4,4'-methylene bis(2-chloroaniline) and phenol-aromatic amine-aldehyde resins which are made by the reaction of a phenol such as phenol itself or a substituted phenol having at least one unsubstituted reactive position on the aromatic nucleus, an aldehyde such as formaldehyde or other aliphatic aldehyde and an aromatic amine such as aniline or other aromatic amine having at least one or two amino hydrogens and no or one nitrogen-bonded alkyl group and at least one unsubstituted position ortho or para to the amino group.

When the substrate layer being formed is a microcellular, or foam, product, foaming can be accomplished by employing a small amount of a blowing agent, such as $CO_2$ produced by water included in the reaction mixture (for example, from about 0.1 to about 5 weight percent of water, based upon total weight of the total reaction mixture, i.e., ethylenically unsaturated monomers, organic polyisocyanates, catalysts and other additives), or through the use of blowing agents which are vaporized by the exotherm of the reaction, or by a combination of the two methods. Illustrative blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,-trifluoromethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, and the like. The quantity of blowing agent employed will vary with such factors such as the density desired in the foamed product. In general, foam densities of from about 20 to about 90, and preferably from 40 toabout 70, lbs per cubic foot are suitable. The unfoamed materials can, of course, be more dense, with suitable densities ranging up to 125 lbs per cubic foot and even higher.

When forming a foamed substrate layer, it may be advantageous to employ small amounts, e.g., about 0.01 percent to 5.0 percent by weight based on the total substrate layer reaction mixture, of a foam stabilizer, e.g., such as a "hydrolyzable" polysiloxane-polyoxyalkylene block copolymer such as the block copolymers described in U.S. Pat. Nos. 2,834,748 and 2,917,480. Another useful class of foam stabilizers are the "nonhydrolyzable" polysiloxane-polyoxyalkylene block copolymers such as those described in U.S. Pat. No. 3,505,377 and U.K. Patent Specification No. 1,220,471. These various polysiloxane- polyoxyalkylene block copolymers preferably contain from about 5 to about 50 weight percent of polysiloxane polymer with the remainder being polyoxyalkylene polymer.

It is, of course, within the scope of this invention to apply a second cosmetic layer (c) to the other side of substrate layer (b) in which case substrate layer (b) will function as the core of the resulting composite product. Such an embodiment is an especially useful way to provide an essentially all-polymer door. The exposed surfaces of cosmetic layers (a) and (c) can, if desired, be made to reproduce the visual effect and texture of natural wood for a more pleasing appearance.

There are a number of ways in which the cosmetic layer and the substrate layer can be provided with, respectively, the first and second chemically reactive functionalities. So, for example, the cosmetic layer can be comprised of a polymer which contains chemically reactive groups within its structure, e.g., hydroxyl groups as in the previously mentioned case of an acrylonitrile-butadiene-styrene-vinyl alcohol resin. Another approach is to provide the cosmetic layer as a blend of two or more resins at least one of which possesses chemically reactive groups within its structure.

One convenient way in which such a blend can be provided is to apply to a surface of the cosmetic layer, e.g., one of acrylic resin, a primer, or chemical bonding agent, which is a solution of thermosetting phenolic resin capable of dissolving the cosmetic layer. In the case of an acrylic cosmetic layer, the presence of methyl methacrylate monomer in the primer will result in some dissolution of the resin, e.g., to a level of from about 0.5 to about 10 percent or more of the thickness of the layer depending upon the amount of monomer present and the duration of contact with the surface of the layer to which it has been applied. The primer can be applied one or more times in any suitable way, e.g., by brushing, spraying, etc. Within a short time of its application, e.g., from about 10 seconds to about 10 minutes (or longer if desired), the relatively volatile solvent component of the primer will have substantially evaporated leaving a surface containing chemically reactive free hydroxyl groups. The affected surface of the acrylic layer will remain chemically reactive for a relatively long period, e.g., up to 24 hours or even longer, following application of the primer. As a result of the foregoing partial dissolution of acrylic resin, the thermosetting phenolic resin will become blended therewith thereby effectively incorporating free hydroxy functionality in the cosmetic layer which is available to react with free isocyanate functionality present in the precursor components of the substrate layer. During curing of the substrate layer, the hydroxyl group present in the acrylic layer will have undergone reaction with the isocyanate group in the substrate layer to form relatively strong urethane linkages which chemically unite the two layers.

In yet another variation of the chemical bonding system described above, chemically reactive groups present on the cosmetic layer and in the precursor components of the substrate layer can be made to react with a coupling agent containing appropriate chemically reactive functionalities. For example, the free hydroxyl groups of a primer-coated acrylic cosmetic layer and free isocyanate groups within the pre-cured substrate layer will react with a dicarboxylic acid such as maleic acid (which may initially be present as the corresponding anhydride) or a hydroxy-carboxylic acid such as 1-hydroxycaproic acid (which may initially be present at the corresponding lactone) present in either layer, and preferably the substrate layer, to provide chemical bonding between the two layers, e.g., ester linkages or a combination of ester and urethane linkages, resulting from the curing operation.

The strength of the bonding between the cosmetic and substrate layers, and therefore the impact strength and resistance to delamination of the composite structure, depends to a large extent on the type and number of chemical linkages present. For a given cosmetic layer (a) and substrate layer (b), it is a fairly simple matter to determine the optimum compositional and processing variables required to achieve a predetermined bond strength. Ordinarily, in accordance with the present invention, one can typically obtain bond strengths on an order of from about 80 to about 150 lbs with from about 100 to about 130 lbs being routinely achievable for most composites possessing a foamed substrate layer. Such bond strengths impart a high level of impact resistance to the composite of this invention as well as a high level of resistance to delamination when the composite is subjected to an abrupt change of temperature.

Although a variety of fabrication techniques can be used to provide the composite herein, the considerable production economies realized with RIM and RRIM procedures make these especially useful techniques for practicing the invention. RIM and RRIM are useful both in the case of unfoamed as well as foamed substrates. Packing densities, i.e., the ratio of the volume of resin mixture to the volume of the mold, are from about 20% to about 100% are advantageously employed.

Referring now to FIG. 1, polymer composite 20 includes a cosmetic, or finish, layer 26 which is chemically bonded to reinforced, cross-linked isocyanate-modified dense thermosetting unsaturated polyester dense foam substrate layer 28 through urethane linkages formed during the curing of layer 26. The average thickness of cosmetic layer 26, advantageously fabricated from a glossy, abrasion-resistant resin such as polymethacrylate, can range from about 0.5 to about 5 cm. The average thickness of dense foam substrate layer 28 can range from about 5 to about 25 cm and the density of the foam can range from about 20 to about 90 lbs per cubic foot.

Figure 2:
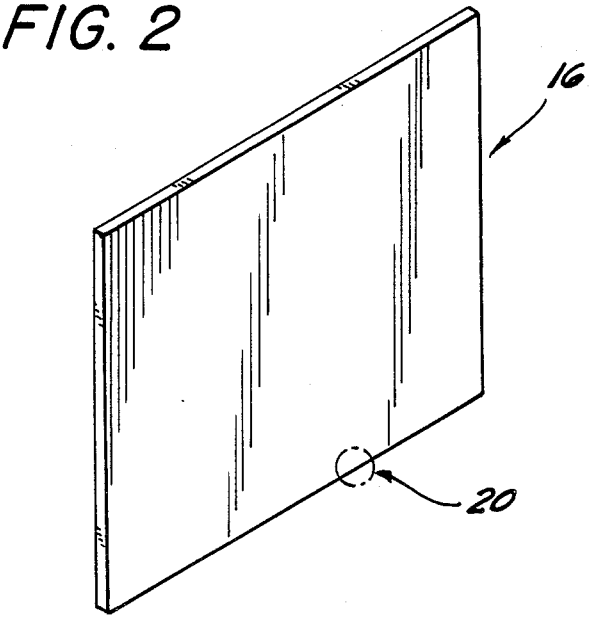
FIG. 2 is an isometric view of a panel constructed from the polymeric composite of FIG. 1; and, FIG. 3 is a schematic diagram of the material flow of a RIM process for manufacturing the composite of this invention.
Figure 3:
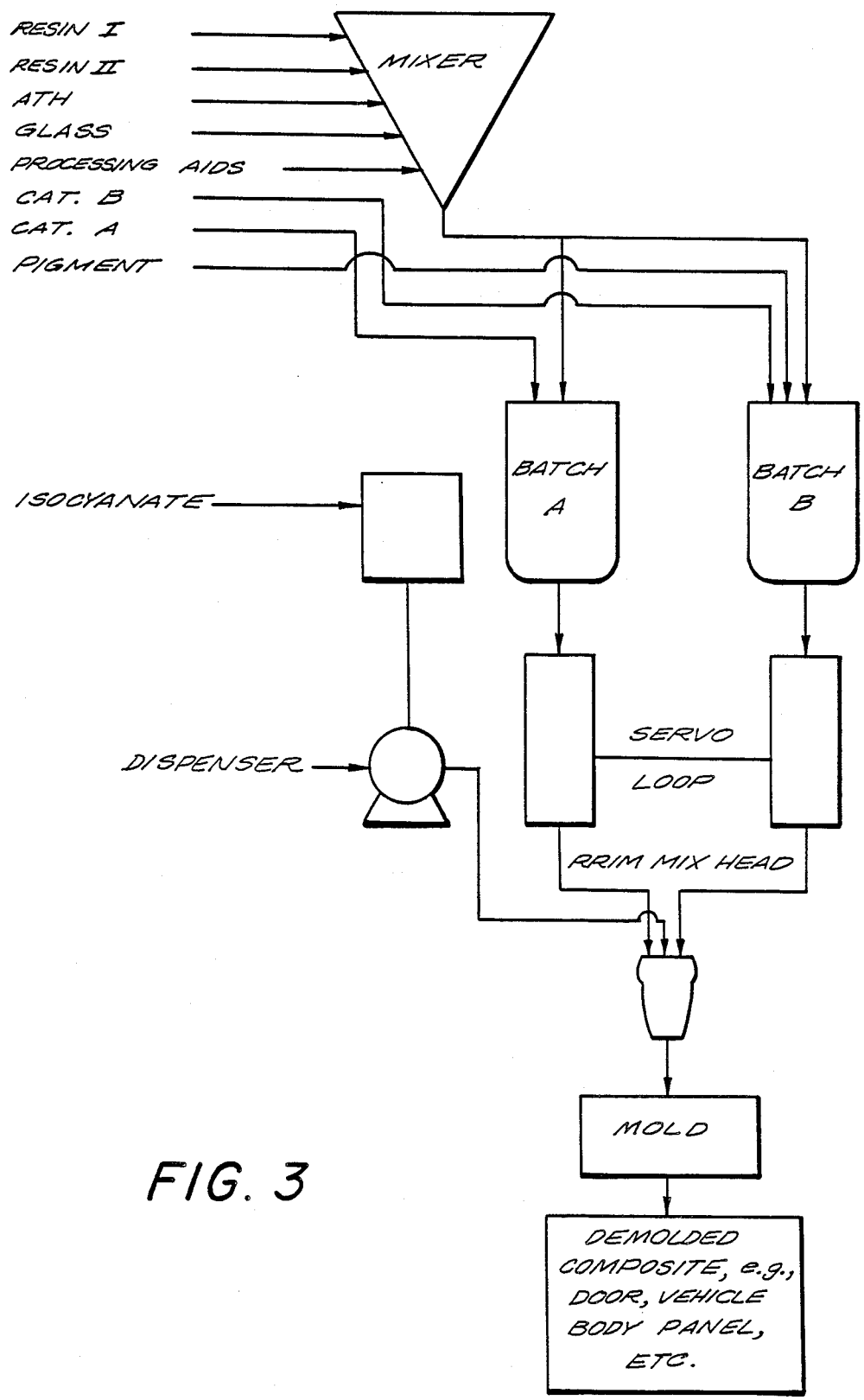

Polymer composite 20 can be manufactured in various ways, e.g., by spray-up, hand lay-up, RIM, RRIM or RTM techniques. FIG. 3 schematically illustrates the use of known and conventional RRIM procedures in manufacturing the composite of this invention, e.g., in the form of the panel shown in FIG. 2. In accordance with these procedures, a flat acrylic sheet of approximately 3 cm average thickness is supported on one surface of a mold. A solution of chemical bonding agent containing 50 weight parts of a thermosetting phenolic resin (25 weight percent), thermoplastic urethane elastomer (2 weight percent) and organo functional silane (1 weight percent) in a solvent system containing alcohol (2 weight percent), methyl ethyl ketone (35 weight percent), ethylene glycol monoethyl ether acetate (28 weight percent) and xylene (7 weight percent) and 50 weight parts of methyl methacrylate solvent is applied to the exposed surface of the acrylic sheet. The methyl methacrylate component of the bonding agent causes some superficial dissolution of the surface of the acrylic sheet with the result that the thermosetting phenolic component of the bonding agent and the dissolved acrylic resin form a solution, or blend, presenting free hydroxyl groups for reaction with free isocyanate groups in the later-applied reaction mixture providing the substrate layer.

The components of the reinforced isocyanate-modified polyester dense foam reaction mixture which upon curing will provide the substrate layer of the polymeric composite structure are formulated into two separate batches, Batch A and Batch B. Initially, a mixing operation is carried out to provide the following Pre-Batch Mix:

| Weight Parts | Pre-Batch Mix Component |
| --- | --- |
| 80 | Unsaturated Polyresin Syrup containing Vinyl Comonomer (Pioneer 236) |
| 20 | ASHLAND V110-2 Monomer (Ashland Chemical Company) |
| 100 | Aluminum trihydrate (as fire retardant) |
| 30 | ¼" chopped glass fiber reinforcement |
| 0.3 | Silicone Surfactant (Dow Corning 193) |

Approximately equal amounts of the foregoing Pre-Batch Mix are incorporated in Batches A and B formulated as follows:

| Batch A | |
| --- | --- |
| Weight Parts | Component |
| ~115 | Pre-Batch Mix |
| 3 | Catalyst A (Dimethylethanolamine) |

| Batch B | |
| --- | --- |
| Weight Parts | Component |
| ~115 | Pre-Batch Mix |
| 1 | Catalyst B (Cumene Hydroperoxide) |
| 1 | Pigment |

Batches A and B are combined at the RRIM mixing head together with 20 weight parts of polymethylene polyphenylisocyanate (Papi 901 from Upjohn). A servo loop is provided to monitor and adjust the ratios of Batches A and B prior to reaching the mixing head. Within 2–4 minutes of the injection of a predetermined quantity of the combined batch reaction mixture into the closed mold (injection time of about 6–8 seconds), the composite structure possessing a dense foam substrate thickness of about 30 cm and a density of about 60 lb per cubic foot has attained a sufficient level of cure to permit demolding.

The polymeric composite resulting from the foregoing RRIM molding operation is highly resistant to delamination when subjected to high impact forces or thermal shock. The surface of the acrylic cosmetic layer is resistant to chipping, cracking or crazing when subjected to direct impact forces.

What is claimed is:

1. A cured polymeric composite of high impact strength and delamination resistance which comprises:
    (a) a polymeric cosmetic layer which, prior to the curing of a substrate layer in mutual contact therewith, possesses a chemically reactive first functionality on at least the surface thereof to be bonded to the substrate layer; and,
    (b) said substrate layer includes a cross-linked isocyanate-modified thermosetting unsaturated mixture of polyester and polyether resin which said substrate layer, prior to curing, possesses a chemically reactive second functionality such that upon curing while in mutual contact with a surface of the cosmetic layer, the substrate layer becomes bonded to the cosmetic layer through chemical linkages formed by reaction of said first and second functionalities.

2. The polymeric composite of claim 1 wherein the polymeric cosmetic layer comprises at least one polymer which possesses the chemically reactive first functionality as part of its molecular structure.

3. The polymeric composite of claim 1 wherein the polymeric cosmetic layer comprises a first polymer which lacks chemically reactive first functionality but at least at its surface is blended with a second polymer which possesses chemically reactive first functionality.

4. The polymeric composite of claim 1 wherein the first functionality is an acrylic resin and the second functionality is a free hydroxyl group-containing thermosetting phenolic resin.

5. The polymeric composite of claim 1 wherein the substrate layer is a foam.

6. The polymeric composite of claim 1 wherein the substrate layer is a dense foam.

7. The polymeric composite of claim 1 wherein the substrate layer contains a reinforcement.

8. The polymeric composite of claim 1 wherein the polyester of the substrate layer is derived from a mixture of unsaturated liquid polyesters at least one of which possesses terminal ethylenic unsaturation and at least one functional group selected from the group consisting of hydroxyl, carboxylic acid and amine groups.

9. The polymeric composite of claim 1 wherein the polyester of the substrate layer is derived from a mixture of unsaturated liquid polyesters at least one of which is obtained by reacting methacrylic acid, maleic anhydride and propylene oxide.

10. The polymeric composite of claim 1 wherein the polymeric cosmetic layer comprises an acrylic resin, the surface of which in mutual contact with the substrate layer is a blend of the acrylic resin and a free hydroxyl group-containing thermosetting resin, the polyester of the substrate layer is a reinforced, dense, foamed polyester resin possessing, prior to curing, free isocyanate groups, the cosmetic layer being chemically bonded to the cured substrate layer.

11. The polymeric composite of claim 1 fabricated as a door.

12. The polymeric composite of claim 1 fabricated as a body panel for a vehicle.

13. The polymeric composite of claim 9 wherein said substrate layer includes a fumarate ester-monoalcohol formed by the isomerication of maleate ester obtained from said reaction of methacrylic acid, maleic anhydride and propylene oxide.

14. A method for forming a cured polymeric composite of high impact strength and resistance to delamination which comprises:
    (a) providing a polymeric cosmetic layer which possesses a chemically reactive first functionality on at least the surface thereof to be bonded to a substrate layer;
    (b) contacting the surface of the cosmetic layer which possesses the first functionality with the precursor components of a substrate layer which includes a cross-linked, isocyanate-modified thermosetting unsaturated mixture of polyester and polyether resin, at least one component of which contains a chemically reactive second functionality capable, under conditions resulting in the cure of the substrate layer, of forming chemical linkages between the cosmetic layer and the substrate layer by reaction of said first and second functionalities; and,
    (c) subjecting the combined cosmetic layer and substrate layer to conditions effecting the cure of the substrate layer and the reaction of said first and second functionalities, thereby providing the cured polymeric composite.

15. The method of claim 14 wherein step (b) is carried out employing a RIM or RRIM procedure.

16. The method of claim 14 wherein there is applied to the surface of the resin constituting the cosmetic layer a primer comprising a solution of thermosetting phenolic resin and an acrylic monomer resin having capability for dissolving the resin of the cosmetic layer.

* * * * *